United States Patent
Abramovitch

(10) Patent No.: US 7,607,343 B2
(45) Date of Patent: Oct. 27, 2009

(54) SYSTEM FOR NANO POSITION SENSING IN SCANNING PROBE MICROSCOPES USING AN ESTIMATOR

(75) Inventor: Daniel Y Abramovitch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 8 days.

(21) Appl. No.: 11/428,176

(22) Filed: Jun. 30, 2006

(65) Prior Publication Data

US 2008/0000292 A1    Jan. 3, 2008

(51) Int. Cl.
*G01B 5/28* (2006.01)
*G01N 13/16* (2006.01)

(52) U.S. Cl. ....................................................... 73/105
(58) Field of Classification Search .................. None
See application file for complete search history.

(56) References Cited

U.S. PATENT DOCUMENTS

| | | | |
|---|---|---|---|
| 5,804,710 A * | 9/1998 | Mamin et al. ................. 73/105 |
| 6,181,131 B1 * | 1/2001 | Bruland et al. ............... 324/300 |
| 7,066,014 B2 * | 6/2006 | Salapaka et al. .............. 73/105 |
| 7,155,964 B2 * | 1/2007 | Huang et al. .................. 73/105 |
| 7,165,445 B2 * | 1/2007 | Bocek et al. .................. 73/105 |

2006/0225490 A1 * 10/2006 Xi et al. ......................... 73/105

OTHER PUBLICATIONS

Tringe, J. W. et al. "Model-based Processing of Microcantilever Sensor Arrays", May 17, 2005, UCRL-JRNL-212326, The institute of Electrical and Electronics Engineers Journal of Microelectromechanical Systems.*
Chen, G.Y. et al. "Resonance response of scanning force microscopy cantilevers" Rev. Sci. Instrum vol. 65, No. 8, Aug. 1994, pp. 2532-2537.*
Woo Chun Choi and Nam Woong Kim, Experimental study on active vibration control of a flexible cantilever using an artificial neural-network state predictor, Smart Material Structure, vol. 5, Dec. 1996, pp. 751-758.*
G. Schitter et al. "High performance feedback for fast scanning atomic force microscopes" Rev. Sci. Instrum. vol. 72, No. 8, Aug. 2001, pp. 3320-3327.*
S. Salapaka et al. High bandwidth nano-positioner: A robust control approach Review Sci. Instrum. vol. 73, No. 9, Sep. 2002, pp. 3232-3241.*
G. Schitter et al. "A new control strategy for high-speed atomic force microscopy" Nanotechnology vol. 15, Nov. 2003, pp. 108-114.*

* cited by examiner

*Primary Examiner*—Daniel S Larkin

(57) ABSTRACT

In accordance with the invention, an estimator is used in the controller portion of a scanning probe microscope to provide precise position estimates of the probe tip which is controlled in the vertical direction by a microelectromechanical system (MEMS) actuator. The precise position estimates typically enhance the ability of the scanning probe microscope to follow the surface and typically provide improved measurements of the surface topography.

24 Claims, 3 Drawing Sheets

SYSTEM FOR NANO POSITION SENSING IN SCANNING PROBE MICROSCOPES USING AN ESTIMATOR

BACKGROUND

Scanning probe microscopes are characterized by the nature of the local probe and its interaction with the surface. Examples of scanning probe microscopes are scanning tunneling microscopes, magnetic force microscopes, electrostatic force microscopes, scanning force microscopes and atomic force microscopes. Atomic force microscopes (AFMs) typically image a surface by applying a thin probe tip attached to the end of a flexible cantilever to the surface to be imaged. As the probe tip moves across the surface, variations in the probe tip height are detected, typically, by the tracking of a laser spot on the cantilever. Deflections of the cantilever due to height variations of the probe tip result in movement of the reflected laser spot on the optical detector. In a constant force mode application, a servo-system is used to keep movement of the reflected laser spot on the optical detector to a minimum by moving the actuator that controls the cantilever to keep the cantilever deflection approximately constant. Because the deflection of the cantilever is due to the interaction between the probe tip and the surface, keeping the deflection approximately constant is equivalent to keeping the force approximately constant. Typically, the cantilever is controlled by a piezoelectric actuator in the prior art.

Because the optical detector is responsive only to the deflection of the cantilever and not the absolute position of the tip, the typical control loop for the servo-system is an output error only loop. Therefore, the output signal from the controller of the servo-system is used as an estimate of the surface topography. This typically limits the bandwidth and accuracy of the position estimate to that of the control loop itself.

BRIEF SUMMARY OF THE INVENTION

In accordance with the invention, an estimator is used in the controller portion of a scanning probe microscope to provide precise position estimates of the probe tip which is controlled in the vertical direction by a microelectromechanical system (MEMS) actuator. The precise position estimates typically enhance the ability of the scanning probe microscope to follow the surface and typically provide improved measurements of the surface topography.

DETAILED DESCRIPTION

Figure 1A:
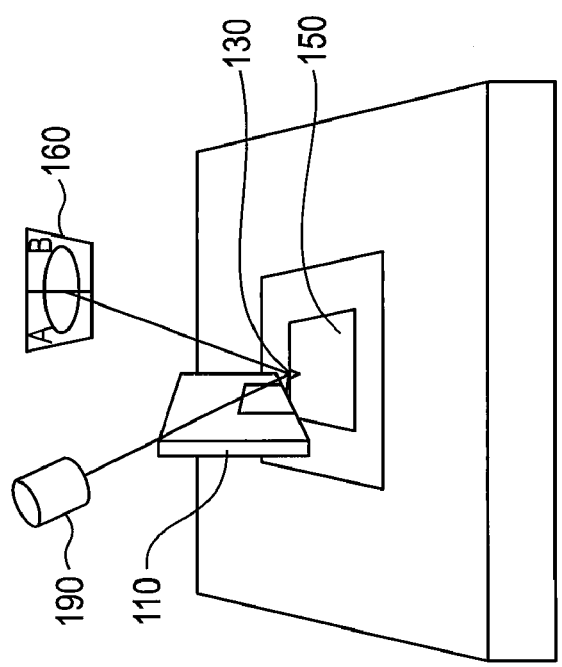
FIG. 1a shows a simplified view of a typical atomic force microscope physical apparatus in accordance with the invention.

FIG. 1a shows a simplified view of the corresponding AFM physical apparatus in accordance with the invention with optical detector 160, MEMS actuator 110, laser source 190, cantilever/probe tip 130 and surface 150.

Figure 1B:
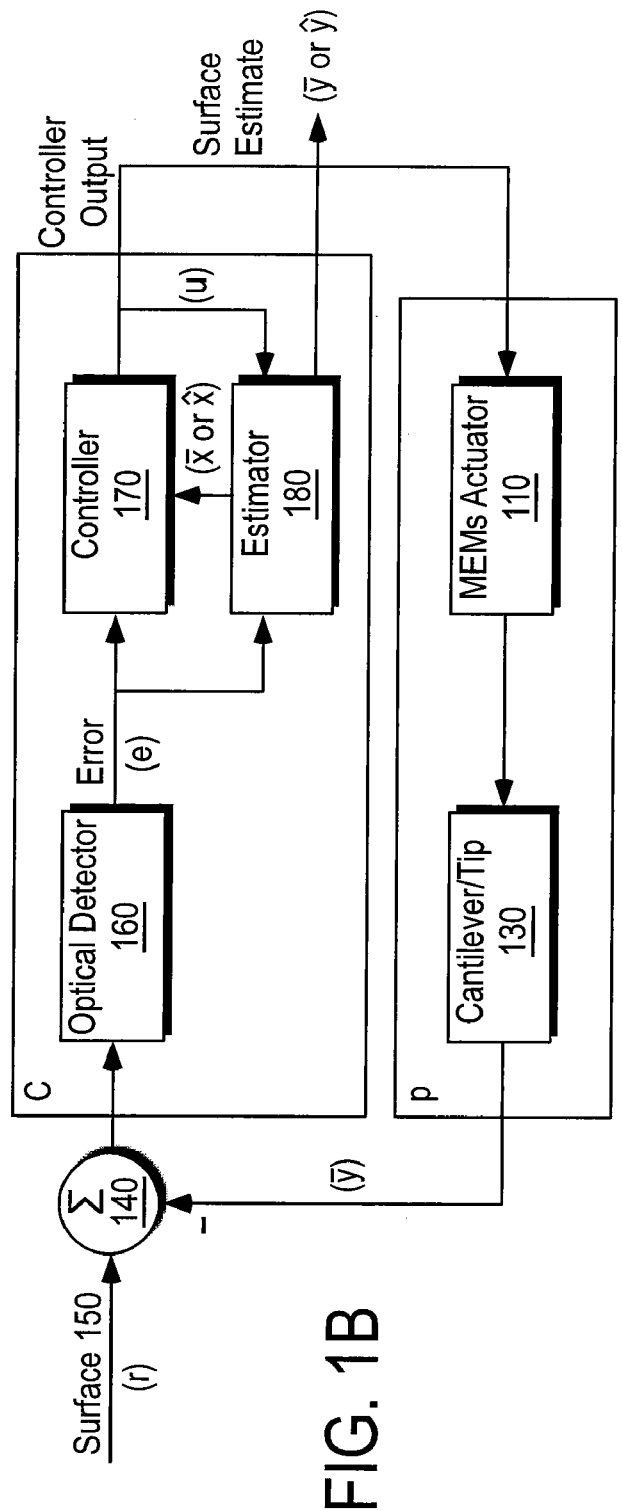
FIG. 1b shows a block diagram of an embodiment in accordance with the invention.

FIG. 1b shows a block diagram for a AFM using MEMS actuator 110 for vertical control and estimator 120 in accordance with the invention. Optical detector 160 is sensitive to the deflection of cantilever/probe tip 130 as cantilever/probe tip 130 moves over surface 150. The input to optical detector 160 is the interaction between the surface elevation (r) on surface 150 and the position (p) of cantilever/probe tip 130 which results in movement of the reflected laser spot on optical detector 160. The control system shown is a single input, single output system or SISO.

The use of MEMS actuator 110 in place of a piezoelectric actuator typically allows a quicker actuator response and avoids the hysteresis effects typically associated with piezoelectric actuators. A comparison of the fundamental resonance frequencies of the respective actuators shows that a piezoelectric actuator typically has a fundamental resonance frequency in the range from about 200 Hz to about 500 Hz whereas a typical choice for MEMS actuator 110 has a fundamental resonance frequency in the range from about 3 kHz to about 50 kHz or higher. Furthermore, typical choices for MEMS actuator 110 can be run at closed-loop frequencies significantly above the fundamental resonant frequency. Examples of MEMS actuator 110 in accordance with the invention are discussed, for example, in U.S. Pat. No. 5,986,381, incorporated herein by reference.

FIG. 1b shows MEMS actuator 110 for an atomic force microscope using only optical detector 160. Optical detector 160 only provides an output error feedback. The output error generated depends on the system model used but there is an error whenever surface 150 has a surface feature (height variation). MEMS actuator 110 typically allows for a more accurate system model than typical piezoelectric actuators. This results in higher performance estimators. The estimators used may be predictive or current. The method of selecting estimator feedback gain, L, typically are pole placement, linear quadratic (LQ) or Kalman filtering and $H^\infty$ design. The more accurate models possible with the use of a MEMS actuator such as MEMS actuator 110 allow the use of a Kalman filter instead of the more conservative and robust $H^\infty$ design typically needed when only less accurate system models are available.

The concept of using an estimator is part of modern control theory and is premised on the idea that having a system model to represent the internal energy storage or "states" of a system allows for better control design. Typically, model based control is performed in the time domain and a mathematical representation of the system is established $$\dot{x} = f(x) + g(x,u) \tag{1}$$

$$y = h(x) + d(x,u) \tag{2}$$

In Eqs. (1) and (2) x is a vector representing all the energy storage elements in the system being modeled, u represents the input to the system, $\dot{x}$ is the time derivative of the system energy storage elements, $f(x)$ is a function that relates the energy storage elements to their time derivative and $g(x,u)$ is a function that relates the input, u, to the time derivative of the energy storage elements. In Eq. (2), the output, y, is a function of the energy storage elements, x, and the input, u.

Typically, the system being modeled is linearized. There may be intermediate forms which resemble linear models but have several nonlinear components. The linearized model for Eqs. (1) and (2) is given by Eqs. (3) and (4) below:

$$\dot{x} = Fx + Gu \tag{3}$$

$$y = hx + du \tag{4}$$

For the SISO system in FIG. 1b, y and u and d are scalar quantities and x, $\dot{x}$ and G are column vectors while h is a row vector and F is a square matrix. The effectiveness of an estimator typically depends on a variety factors, one of which is the accuracy with which the equations are able to model the physical system. Because MEMS actuator 110 can typically be modeled more accurately and consistently than a piezoelectric actuator, MEMS actuator 110 allows for a more easily and accurately modeled system. For sampled data systems Eqs. (3) and (4) become:

$$x(k+1)=\Phi x(k)+\Gamma u(k) \quad (5)$$

$$y(k)=Hx(k)+Du(k) \quad (6)$$

where x(k) is the discrete-time state, $k=kT_S$, $T_S$ is the sample period and u(k) is the input at the time step k. The matrix $\Phi$ relates the propagation of the discrete-time state from one time step to the next. It is typically computed using the continuous time derivative matrix, F, and the sample period, $T_S$. The matrix $\Gamma$ relates the input, u, at the time step k to the state, x, at the next time step, x(k+1). The matrices H and D, relating the state, x, and the input, u, to the output, y, typically do not change in going from a continuous to a discrete linear system. Note, that the boldface convention has been dropped in accordance with the notation common in control theory and it is understood that the respective variables are vectors and matrices. There are numerous methods of discretization covered by the general discussion above and these may be found in standard texts on control theory such as "Digital Control of Dynamic Systems" by G. Franklin, D. Powell and M. Workman or "Computer Controlled Systems" by K. Astrom and B. Wittenmark.

The following discussion treats estimators in discrete time but it is understood that estimators can be used in continuous time or sampled data models as well. Note that theory, analysis and design in some instances may be done in continuous time while the actual implementation is accomplished with sampled data or discrete time methods if the sample rate is high enough and discretization effects are sufficiently small for the discrete equivalent that is constructed. In the continuous form, analog circuitry is employed to implement the selected filter. For the sampled data form, the data is sampled but a combination of analog and digital methods can be used to implement the selected filter. In the discrete form, a digital processor, such as a computer, a digital signal processor (DSP) or programmable logic, e.g. field programmable gate array (FPGA) is typically used.

For the system described by Eqs. (5) and (6), the discrete time estimator is formed by starting with the system model and propagating the estimator state forward by one time step. However, this is an "open loop" approach that has errors that only decay to zero if the system modeled by Eqs (5) and (6) is stable in open loop operation. To guarantee that the errors approach zero, the measured differences between the system outputs and the model outputs are used to correct the state estimate. An embodiment in accordance with the invention of an estimator in general form is given by:

$$\bar{x}(k+1)=\Phi\bar{x}(k)+\Gamma u(k)+L(y(k)-\bar{y}(k)) \quad (7)$$

$$\bar{y}(k)=H\bar{x}(k)+Du(k) \quad (8)$$

Eq. (7) shows the state propagation with the correction added via the feedback gain matrix L where y(k) is the system output. The selection of the feedback gain matrix, L, is a topic in control theory and includes the subjects of Kalman filtering and $H^\infty$ design and mixed $H^2/H^\infty$ design. For single input, single output systems where y and u are scalars, G, H and D are typically replaced with lowercase g, h and d.

Typically, in any estimator, the key set of numbers are in the measurement feedback gain matrix, L. There are numerous ways for determining L in control theory in accordance with the invention. Using the pole placement method involves obtaining the dynamics of the estimator by setting the closed-loop poles of the estimator, which are the poles of $\Phi$-LH in the discrete time formulation or the poles of F-LH in the continuous time formulation. The poles are set based on the desired characteristics of the estimator. Using linear quadratic methods involves modeling the noise entering the system and at the sensors as white Gaussian noise having a known mean and covariance. Based on the model, a least squares estimate is generated. This method also places the poles of $\Phi$-LH in the discrete time formulation or the poles of F-LH in the continuous time formulation but uses least squares weighting between the amount of noise driving the system versus the amount of noise in the measurement. The estimator dynamics are selected to minimize the least squares cost function. Additionally, L evolves in time as opposed to being constant in time. Finally, a measurement of the uncertainty in the estimates is included via a P matrix. Additionally, robust estimators typically known by the optimization criterion, $H^\infty$, may be used but provide lower performance, than, for example, linear quadratic methods discussed above. Furthermore, a mixed $H^2/H^\infty$ design typically seeks a balance between the Kalman filter's performance ($H^2$) and the $H^\infty$ design's robustness.

Another embodiment in accordance with the invention is the predictor estimate form where the most recent measurement of y is used is given by:

$$\bar{x}(k+1)=\Phi\hat{x}(k)+\Gamma u(k) \quad (9)$$

$$\bar{y}(k)=H\bar{x}(k)+Du(k) \quad (10)$$

$$\hat{x}(k+1)=\bar{x}(k+1)+L_P(y(k)-\bar{y}(k)) \quad (11)$$

Eq. (9) propagates the state estimate forward by one time step. Eq. (10) predicts the output $\bar{y}$ based on the state estimate. Eq. (11) corrects the propagation of the state estimate in Eq. (9) based on the measurement of y(k) in the previous time step.

In contrast, another embodiment in accordance with the invention uses the current estimator form:

$$\bar{x}(k+1)=\Phi\hat{x}(k)+\Gamma u(k) \quad (12)$$

$$\bar{y}(k)=H\bar{x}(k)+Du(k) \quad (13)$$

$$\hat{x}(k+1)=\bar{x}(k+1)+L_C(y(k+1)-\bar{y}(k+1)) \quad (14)$$

where Eqs. (12), (13) and (14) have been structured so that Eq. (14) is different from Eq. (11) but Eqs. (9) and (12) and Eqs. (10) and (13) are the same, respectively. The current estimator approach, the correction to the state estimate is made using the most recent measurement, y(k+1). Ideally, this results in less propagation delay through the filter by one time step leading to less phase degradation of the estimator. This is typically important when the estimator is used for feedback control. However, any practical means for computing the filter requires a nonzero amount of time for the digital logic to compute Eq. (14) which results in a finite sample time delay. For the predictive estimator a full sample delay is always present but this better matches the theoretical model. So typically, predictive estimators are easier to model. In the design of a continuous estimator, there is no separate time step between propagating the system state forward and including the measurement correction as everything is continuous.

Note that Eqs. (7)-(14) allow for multiple inputs to the system. From the system model view, only H and L change. Allowing additional inputs, provides additional embodiments in accordance with the invention. For example, some MEMS actuators allow direct measurement of the motor position which provides an extra input besides the relative AFM probe tip position which is determined relative to the surface height and gives a relative error measurement.

If the estimator has access to both the control input to the system, u, and the output, y, the estimator only needs to estimate the physical system and not the closed loop combination of the physical system and the controller. Typically, for AFMs only the output error is available but not the reference and the output. This modifies the form of the estimator.

An embodiment in accordance with the invention as shown in FIG. 1b may use a Kalman filter for selecting estimator feedback gain as noted above. A Kalman filter generates the least squares solution to the problem of selecting the estimator feedback gain if the process noise entering the system being modeled and the measurement noise are Gaussian, white and uncorrelated. The starting point for the Kalman filter formulation starts with the process model equations that describe the evolution of the physical system from one time step to the next:

$$x(k+1)=\Phi x(k)+\Gamma u(k)+\Gamma_w w(k) \quad (15)$$

$$y(k)=Hx(k)+Du(k) \quad (16)$$

$$z(k)=Hx(k)+Du(k)+v(k) \quad (17)$$

which represent a modification of Eqs (5) and (6). Eq. (5) has been modified to yield Eq. (15) by adding w(k) which represents the process noise entering the system and is accompanied by the input matrix, $\Gamma_w$, which may or may not be the same as the control input matrix, $\Gamma$. Note that the system output, y(k) in Eq. (16), is uncorrupted by noise except through the states, x(k). However, the measured system output, z(k) in Eq. (17), includes both the output noise and the measurement noise, v(k). To simplify the following discussion both v(k) and w(k) are taken to be zero mean, white, Gaussian noise that are uncorrelated with one another. It should be noted that the discussion can be extended to deal with nonzero means and to include both colored noise and a correlation between w(k) and v(k). The process noise, w(k) and the measurement noise, v(k) are taken to have the covariances, $R_w$ and $R_v$, where the dimensions are set by the number of system inputs and system outputs, respectively.

The Kalman filter version of the estimator is broken into two steps. Initially, the estimate, $\hat{x}(k)$, is propagated forward in time for a time update:

$$\bar{x}(k+1)=\Phi\hat{x}(k)+\Gamma u(k) \quad (18)$$

$$M(k+1)=\Phi P(k)\Phi^T+\Gamma_w R_w \Gamma_w^T \quad (19)$$

In Eq. (18), $\bar{x}(k+1)$ is the best prediction of the state at the next time step using the best estimate of the system state, $\hat{x}(k)$ and the input u(k). In Eq. (19), M(k+1) is the prediction of the uncertainty of that state estimate. At measurement steps, the estimates are corrected using the current surface measurement. Alternatively, a correction may be made using the previous measurement, in the form of a predictive estimator.

The surface measurement update is given by:

$$\hat{x}(k)=\bar{x}(k)+L(k)(z(k)-\bar{y}(k)) \quad (20)$$

$$\bar{y}(k)=H\bar{x}(k)+Du(k) \quad (21)$$

$$L(k)=P(k)H^T R_v^{-1} \quad (22)$$

$$P(k)=M(k)-M(k)H^T(HM(k)H^T+R_v)^{-1}HM(k) \quad (23)$$

The surface measurement update adjusts for the new data from a measurement. Here, $\hat{x}(k)$ is the best estimate of the state after the surface measurement at time k and Eq. (20) adjusts the state estimate to include the results of the last measurement z(k). L(k) is the estimator gain matrix and represents a gain correction that determines how much of the measurement is used to correct the predicted state and balances out the uncertainty in the state estimate with the uncertainty in the measurement. P(k) represents the measurement uncertainty in the state estimate after the measurement has been made, hence Eq. (23) adjusts the estimate of the state covariance matrix, P(k).

For an embodiment as shown in FIG. 1b using only optical detector 160 to provide an output error feedback, an actual measurement, z(k), of the system output, y(k), is unavailable. Only the measurement error is available and this corresponds to the difference between the reference, including the surface variation and any reference deflection of cantilever/probe tip 130, and the system output:

$$e(k)=r(k)-y(k)+v(k) \quad (24)$$

Hence, when the output is perturbed, the perturbation does not appear in the estimator until the perturbation has passed through the error estimator dynamics. This indicates that it is typically advantageous to have estimators with a higher bandwidth than the estimators that are typically available with robust designs such as $H^\infty$. With a robust estimator, the bandwidth is typically comparatively low, so that errors typically take more time to settle out while with a higher performance estimator the bandwidth is typically comparatively higher so that errors are typically suppressed in less time. For the embodiment shown in FIG. 1b, Eq. (20) becomes:

$$\hat{x}(k)=\bar{x}(k)+L(k)e(k) \quad (25)$$

and the measurement update consists of Eqs. (25), (21), (22) and (23). Starting with initial matrices, $R_w$, $R_v$, M(0), P(0) and L(0), Eqs. (18) and (19) of the time update along with Eqs. (25), (21), (22) and (23) of the surface measurement update are used to provide system state estimates at each time step.

The system state estimates can be used in a variety of ways. For an embodiment in accordance with the invention as shown in FIG. 1b, a least squares estimate of the position of cantilever/probe tip 130 of the AFM is given by:

$$\bar{y}(k)=H\bar{x}(k)+Du(k) \quad (26)$$

from which a least squares estimate of surface 150 can be obtained. If there is no direct feed through from the control input, u(k), to the output, $\bar{y}(k)$ then D=0 and Eq. (26) becomes:

$$\bar{y}(k)=H\bar{x}(k) \quad (27)$$

This is typically the case in a large variety of physical systems where the input cannot directly effect the output. Instead, the input, u, effects the system state, x, which in turn effects the output, y. Typical actuators such as piezoelectric actuators, voice coils and MEMS actuators have this characteristic.

Additionally, for an embodiment in accordance with the invention as shown in FIG. 1b, a least squares estimate of the position of cantilever/probe tip 130 of the AFM is also given by:

$$\hat{y}(k)=H\hat{x}(k)+Du(k) \quad (28)$$

from which a least squares estimate of surface 150 can be obtained. If there is no direct feed through from the control input, u(k), to the output, $\bar{y}(k)$, then D=0 and Eq. (28) becomes:

$$\hat{y}(k)=H\hat{x}(k) \quad (29)$$

While it is not causal to use $\hat{y}(k)$ in generating $\hat{x}(k)$, it is possible to use $\hat{y}(k)$ as a surface estimate. In this case, $\hat{y}(k)$ is typically an improved estimate of surface 150 over $\bar{y}(k)$, since $\hat{y}(k)$ makes use of the most recent measurement.

P(k) is an estimate of the uncertainty in $\hat{x}(k)$ while M(k) is an estimate of the uncertainty in $\bar{x}(k)$. Either P(k) or M(k) or both P(k) and M(k) can be used to provide an estimate of the uncertainty in the surface measurement and either $\hat{x}(k)$ or $\bar{x}(k)$ may be used in feedback controller 170. The quantities $\bar{x}(k)$ and M(k) are from a time update, when the estimate is propagated forward in time one step before the next measurement. M(k) is the estimate for the covariance of $\bar{x}(k)$. The quantities $\hat{x}(k)$ and P(k) are taken after the measurement. Typically, it is assumed that every measurement contains some information and that proper weighting has been assigned to the measurement versus the quantities propagated by the model so that typically P(k), the estimate for the covariance of $\hat{x}(k)$, is lower than M(k), the estimate for the covariance of $\bar{x}(k)$.

An embodiment in accordance with the invention may use a steady state Kalman filter. The use of a steady state Kalman filter is appropriate when M(k) converges to a steady state value when the uncertainty from the initial conditions has decayed and this means that both P(k) and L(k) also converge. The time update becomes:

$$\bar{x}(k+1)=\Phi\hat{x}(k)+\Gamma u(k) \quad (30)$$

while the surface measurement update becomes:

$$\hat{x}(k)=\bar{x}(k)+Le(k) \quad (31)$$

$$\bar{y}(k)=H\bar{x}(k)+Du(k) \quad (32)$$

$$L=P_{SS}H^T R_T^{-1} \quad (33)$$

where $P_{SS}$ indicates the steady state value of P. Note that the estimator matrix L given by Eq. (33) may be calculated in advance and stored.

Figure 2:
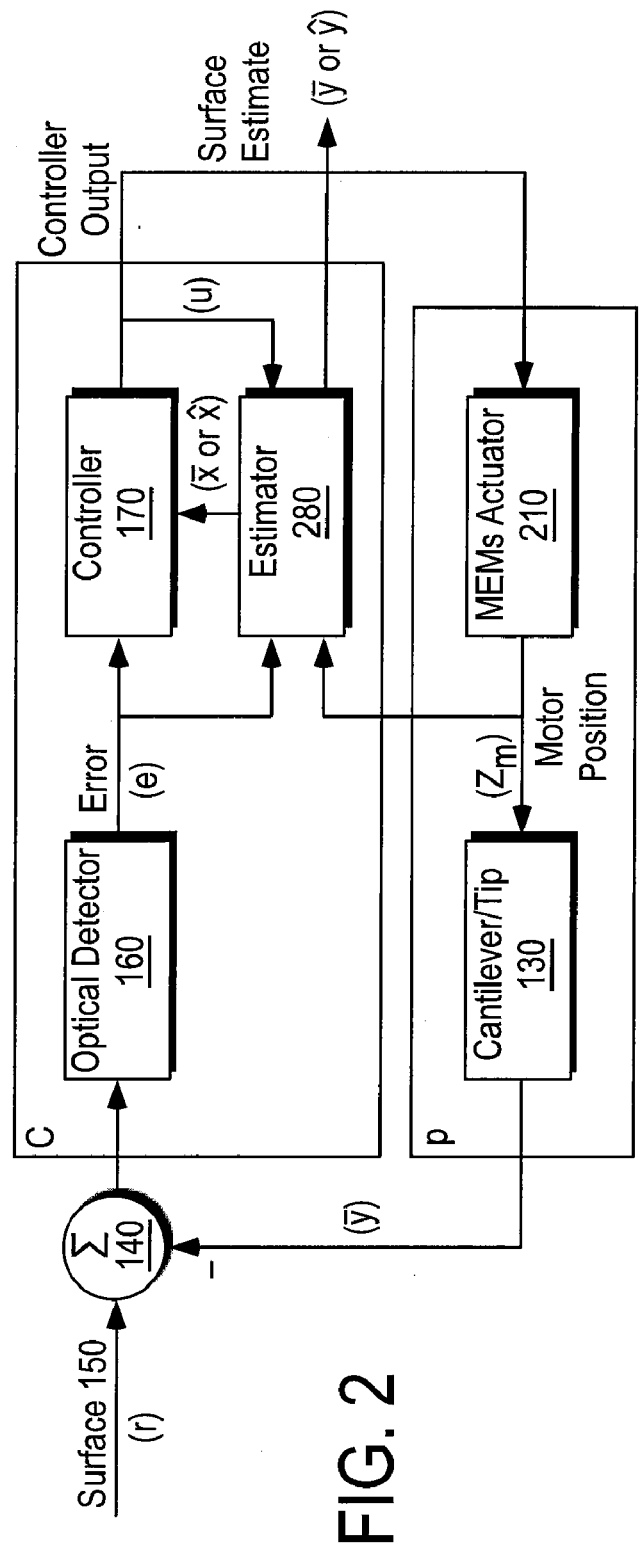
FIG. 2 shows a block diagram of an embodiment in accordance with the invention.

FIG. 2 shows the use of multiple sensors in a MEMS based AFM. In accordance with an embodiment of the invention, MEMS actuator 210 includes a position sensor that provides absolute position information for MEMS actuator 210. This is used to supplement the estimation of surface 150. Because the actuator position sensor provides absolute position information of the actuator which is related to the probe tip position through the effect of cantilever dynamics, the absolute position information can be used to eliminate drift issues that typically occur in AFMs that estimate the surface topography using only input from optical detector 160. Drift issues occur because optical detector 160 cannot know the absolute spatial position of MEMS actuator 210 if only relative position error is provided. The measurement of the absolute position of MEMS actuator 210 is physically and dynamically very close to cantilever/probe tip 130. Therefore, the dynamics that exist between position of cantilever/probe tip 130 which is a measurement of surface 160 and the measured position of MEMS actuator 210 are limited. Further, the addition of extra information into estimator 280 typically improves the signal to noise ratio.

The equations for estimator 280 have modified dimensions from Eqs. (25), (21), (22) and (23) while the time update is unchanged. The system state estimated by $\hat{x}(k)$ or $\bar{x}(k)$ has the same dimensions as before but the output matrix, H, and the estimator gain matrix, L(k), change dimensions. Assuming the system state has dimensionality n, then $R_v$ is a 2×2 matrix, H is a 2×n and L is a n×2 matrix. Eqs. (25), (21), (22) and (23) become:

$$\hat{x}(k) = \bar{x}(k) + L(k)\begin{bmatrix} e_0(k) \\ z_m(k) - H(2,:)\bar{x}(k) \end{bmatrix} \quad (34)$$

$$\bar{y}(k) = H\bar{x}(k) + Du(k) \quad (35)$$

$$L(k) = P(k)H^T R_v^{-1} \quad (36)$$

$$P(k) = M(k) - M(k)H^T(HM(k)H^T + R_v)^{-1} HM(k) \quad (37)$$

respectively, where H(2,:) denotes the second row of the H matrix and $e_0(k)$ is the error derived from optical sensor 160. The matrix, L, adjusts the system state estimate, $\hat{x}(k)$, using the two available measurements. While the system state estimates $\hat{x}(k)$ or $\hat{x}(k)$ are still n×1 column vectors, their covariance which represents the uncertainty is typically reduced due to the availability of two measurements. While $e_0(k)$ is the error term derived from optical sensor 160, the second error term is formed by taking the position, $z_m$, of MEMS actuator 210 and subtracting the estimated motor position, $H(2:)\bar{x}(k)$ from it. The second error term, $z_m(k)-H(2:)\bar{x}(k)$, comes from MEMS actuator 210. Because it is much closer physically and dynamically to the position, P, of cantilever/probe tip 130 than the control input, u(k), the second error term provides for more position information entering estimator 280 and results in a better estimate of the system state and surface 150. Starting with initial matrices, $R_w, R_v, M(0), P(0)$ and $L(0)$, Eqs. (18) and (19) of the time update along with Eqs. (34), (35), (36) and (37) of the surface measurement update are used to provide system state estimates at each time step.

The state estimates can be used in a variety of ways. For an embodiment in accordance with the invention as shown in FIG. 2, a least squares estimate of the position of cantilever/probe tip 130 of the AFM is given by:

$$\bar{y}(k)=H\bar{x}(k)+Du(k) \quad (39)$$

from which a least squares estimate of surface 150 can be obtained. If there is no direct feed through from the control input, u(k), to the output, $\bar{y}(k)$, then D=0 and Eq. (39) becomes:

$$\bar{y}(k)=H\bar{x}(k) \quad (40)$$

Additionally, for an embodiment in accordance with the invention as shown in FIG. 2, a least squares estimate of the position of cantilever/probe tip 130 of the AFM is also given by:

$$\hat{y}(k)=H\hat{x}(k)+Du(k) \quad (41)$$

from which a least squares estimate of surface 150 can be obtained. If there is no direct feed through from the control input, u(k), to the output, $\bar{y}(k)$, then D=0 and Eq. (41) becomes:

$$\hat{y}(k)=H\hat{x}(k) \quad (42)$$

While it is not causal to use $\hat{y}(k)$ in generating $\hat{x}(k)$, it is possible to use $\hat{y}(k)$ as a surface estimate. In this case, $\hat{y}(k)$ is typically an improved estimate of surface 150 over $\bar{y}(k)$, since $\hat{y}(k)$ makes use of the most recent measurement.

Again an embodiment in accordance with the invention may use a steady state Kalman filter. The use of a steady state Kalman filter is appropriate when M(k) converges to a steady state value when the uncertainty from the initial conditions has decayed and this means that both P(k) and L(k) also converge. The time update is:

$$\bar{x}(k+1) = \Phi \hat{x}(k) + \Gamma u(k) \quad (43)$$

while the surface measurement update becomes:

$$\hat{x}(k) = \bar{x}(k) + L \begin{bmatrix} e_0(k) \\ z_m(k) - H(2:)\bar{x}(k) \end{bmatrix} \quad (44)$$

$$\bar{y}(k) = H\bar{x}(k) + Du(k) \quad (45)$$

$$L = P_{SS} H^T R_T^{-1} \quad (46)$$

As for the earlier steady state Kalman filter embodiment, the P and L matrices are constant and L can be calculated in advance and stored.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A scanning probe microscope system comprising:
   a microelectromechanical system actuator operable to move a flexible cantilever mechanically coupled to a probe tip;
   an optical detector optically coupled to said flexible cantilever;
   a controller, said controller electrically coupled to said microelectromechanical system actuator and electrically coupled to said optical detector; and
   an estimator having an estimator feedback gain, said estimator electrically coupled to said optical detector and electrically coupled to said controller where said estimator is operable to receive an error signal from said optical detector and operable to use said error signal and said estimator feedback gain to generate a state estimate, said state estimate output to said controller, said controller operable to provide a control signal to said microelectromechanical system actuator to maintain a deflection of said flexible cantilever at an approximately constant value,
   wherein said control signal depends on said state estimate.

2. The system of claim 1 wherein said estimator predicts a future value of said state estimate.

3. The system of 1 wherein said estimator is current.

4. The system of claim 1 wherein said estimator is a discrete time estimator.

5. The system of claim 1 wherein said estimator is a higher bandwidth estimator.

6. The system of claim 1 wherein said estimator feedback gain is selected by the method of pole placement.

7. The system of claim 1 wherein said estimator feedback gain is selected by the method of $H^\infty$ design.

8. The system of claim 1 wherein said estimator feedback gain is selected by the method of mixed $H^2/H^\infty$ design.

9. The system of claim 1 wherein the estimator feedback gain is selected by use of a Kalman filter.

10. The system of claim 9 wherein said Kalman filter is a steady state Kalman filter.

11. The system of claim 1 wherein said estimator is operable to generate a surface estimate.

12. The system of claim 11 wherein there is no direct feed through from said control input to said surface estimate.

13. A scanning probe microscope system comprising:
    a microelectromechanical system actuator operable to move a flexible cantilever mechanically coupled to a probe tip, said microelectromechanical system actuator comprising a position sensor operable to provide absolute position information signal for said microelectromechanical system actuator;
    an optical detector optically coupled to said flexible cantilever, said optical detector operable to provide an error signal;
    a contoller operable to generate a control input signal, said controller electrically coupled to said microelectromechanical system actuator and electrically coupled to said optical detector; and
    an estimator having an estimator feedback gain, said estimator electrically coupled to said optical detector and electrically coupled to said controller where said estimator is operable to receive said error signal, said absolute position information signal and said control input signal, said estimator operable to use said error signal, said estimator feedback gain, said absolute position information signal and said control input signal to generate a state estimate receivable by said controller, said controller operable to provide said control input signal to said microelectromechanical system actuator to maintain a deflection of said flexible cantilever at an approximately constant value;
    wherein said control input signal depends on said state estimate.

14. The system of claim 13 wherein said estimator predicts a futher value of said state estimate.

15. The system of claim 13 wherein said estimator is current.

16. The system of claim 13 wherein said estimator is a discrete time estimator.

17. The system of claim 13 wherein said estimator is a higher bandwidth estimator.

18. The system of claim 13 wherein said estimator feedback gain is selected by the method of pole placement.

19. The system of claim 13 wherein said estimator feedback gain is selected by the method of $H^\infty$ design.

20. The system of claim 13 wherein said estimator feedback gain is selected by the method of mixed $H^2/H^\infty$ design.

21. The system of claim 13 wherein said estimator feedback gain is selected by use of a Kalman filter.

22. The system of claim 21 wherein said Kalman filter is a steady state Kalman filter.

23. The system of claim 13 wherein said estimator is operable to generate a surface estimate.

24. The system of claim 23 wherein there is no direct feed through from said control input to said surface estimate.

* * * * *